(12) United States Patent
Rivin

(10) Patent No.: US 7,465,120 B2
(45) Date of Patent: Dec. 16, 2008

(54) WEDGE MECHANISM

(76) Inventor: Evgeny I. Rivin, 4227 Foxpointe Dr., West Bloomfield, MI (US) 48323

(*) Notice: Subject to any disclaimer, the term of this patent is extended or adjusted under 35 U.S.C. 154(b) by 1215 days.

(21) Appl. No.: 10/113,524

(22) Filed: Apr. 1, 2002

(65) Prior Publication Data

US 2003/0185624 A1    Oct. 2, 2003

(51) Int. Cl.
*F16F 1/38* (2006.01)
*E01C 11/02* (2006.01)

(52) U.S. Cl. .............. 403/225; 403/220; 403/227; 403/228; 403/291; 404/51; 404/85

(58) Field of Classification Search ............ 403/220, 403/225, 227, 228, 291; 404/51, 85
See application file for complete search history.

(56) References Cited

U.S. PATENT DOCUMENTS

| | | | | |
|---|---|---|---|---|
| 2,900,182 A | * | 8/1959 | Hinks | .................. 267/282 |
| 3,519,260 A | * | 7/1970 | Irwin | .................. 267/152 |
| 3,924,907 A | * | 12/1975 | Czernik et al. | |
| 3,993,371 A | * | 11/1976 | Orndorff, Jr. | |
| 4,063,787 A | * | 12/1977 | Bakken et al. | .............. 384/221 |
| 4,772,151 A | * | 9/1988 | Lammers et al. | ............ 403/162 |
| 5,595,540 A | * | 1/1997 | Rivin | .................. 464/85 |
| 6,213,257 B1 | * | 4/2001 | Yano et al. | |
| 2001/0049344 A1 | * | 12/2001 | Levy | |
| 2002/0047498 A1 | * | 4/2002 | Hooley | |

* cited by examiner

Primary Examiner—Victor Macarthur
(74) Attorney, Agent, or Firm—Allen Krass

(57) ABSTRACT

A mechanical wedge mechanism comprising base member, output member, and movable wedge member in which frictional connections between mutually movable mechanical members are replaced with shear deformations in elastomeric shims connecting respective surfaces of the members, thus effectively reducing frictional losses in the mechanism.

4 Claims, 3 Drawing Sheets

WEDGE MECHANISM

FIELD OF THE INVENTION

The present invention relates to force- and motion-transformation mechanisms.

BACKGROUND OF THE INVENTION

Wedge mechanisms are widely used in mechanical devices. The most important applications of the wedge mechanisms are as force amplifiers Thus, the wedge mechanisms and their analogs are universally used in clamping mechanisms wherein relatively small forces applied manually or by means of relatively small and low power motors/actuators can be transformed into much larger clamping forces. The basic conventional wedge mechanism (the Prior Art) in FIG. 1 comprises base member 1, movable wedge member 2, and output member 3. These members have sliding frictional contacts along flat or curved conformal surfaces 4 between members 1 and 2 and along flat or curved conformal surfaces 5 between members 2 and 3. Usually the respective contact surfaces of members 1 and 2 and of members 2 and 3 are separated by a thinner or thicker layer of a lubricating material (e.g., oil). Output member 3 may apply the output force and/or motion to work organ 6, or may have itself the role of the work organ. If the former is true, there is contact surface 7 between output member 3 and work organ 6. The motion of output member 3 or work organ 6 is constrained/guided by guideways 8 of various embodiments. Application of input force $F_i$ to wedge member 2 initiates movement of this wedge member along the contact surfaces 4 and 5 after the static friction force in the frictional contacts 4 and 5 are overcome. If there is no friction in contacts 4 and 5 (friction coefficient f=0), application of input force $F_i$ results in development of output force $F_o$ acting on output member 3, $$F_o = F_i/\tan \alpha, \qquad (1)$$

and also of reaction force N normal to contact surfaces 4 and acting on base member 1, $$N = F_i/\tan \alpha. \qquad (2)$$

Thus, for $\alpha<45°$, $F_o>F_i$, the output force is greater than the input force. For small angles $\alpha$, the effect is increasing so that $F_o>>F_i$. The displacement $\Delta_i$ of wedge member 2 is causing displacement $\Delta_o$ of output member 3 guided by guideways 8. If the vertical displacement of member 3 is allowed as shown in FIG. 1, then $$\Delta_o = \Delta_i \tan \alpha. \qquad (3)$$

For $\alpha<45°$, $\Delta_o<\Delta_i$, and for small $\alpha$, $\Delta_o<<\Delta_i$; $F_i \Delta_i = F_o \Delta_o$ for f=0.

When the friction coefficient f>0, the equation (1) is changing and becomes $$F_o = \frac{F_i}{\tan(\alpha+\rho)}, \qquad (4)$$

where $\rho=\tan^{-1} f$ is the friction angle. Equation (3) is not influenced by presence of friction, but if displacement $\Delta_i$ of moving wedge member 2 is very small and angle $\alpha$ is small (such combination is typical for clamping devices), the very small displacement $\Delta_o$ is not physically occurring and $\Delta_o$ is accommodated by elastic deformations in the mechanism.

Usually, for lubricated steel contact surfaces f=0.1-0.2, or $\rho=5.7$-$11.3°$. As a result, for small wedge angles $\alpha$ the ideal large magnitude of the mechanical advantage per (1) does not materialize, and actual mechanical advantage $F_o/F_i$ for a given f deteriorates to a larger and larger degree the more the wedge angle $\alpha$ is reduced. For $\alpha=10°$ the mechanism with f=0 would deliver the output force $F_o = F_i/\tan 10° = 5.7\,F_i$. However, for $\rho=7°$ (f=0.12), from (4) $F_o = F_i/\tan 17° = 3.3\,F_i$, 40% less than the ideal mechanical advantage 5.7. For $\alpha=5°$, the ideal mechanism described by (1) would deliver the output force $F_o = F_i/\tan 5° = 11.4\,F_i$, more than ten times force amplification. However, for $\rho=7°$, f=0.12, from (4) $F_o = F_i/\tan 12° = 4.7\,F_i$, 60% less than the ideal mechanical advantage. Even worse deterioration from the ideal efficiency/mechanical advantage would develop for more realistic larger values of f. As a result, wedge angles smaller than $\alpha<\sim5°$ are seldom used in practical designs and relatively high driving (input) forces should be used, thus increasing size and weight of the mechanisms, requiring two-stage mechanisms, etc. The noted above lack of mobility in the mechanism at small displacements due to static friction forces, leads to a need to increase stiffness of the mechanism and thus further increase its size, weight, and cost of the devices employing wedge mechanisms.

Since conventional (prior art) wedge mechanisms benefit from low friction and higher stiffness, usually their structural parts, such as members 1, 2, 3 in FIG. 1 are made from steel subjected to heat treatment for increasing hardness, the contact surfaces have to be made with high geometric accuracy and high surface finish. The contact surfaces have to be well lubricated and well protected since any scratches would result in increased friction and reduced efficiency. Since the sliding friction coefficients between conforming surfaces depend on vibratory environment, presence of vibrations can change the effective friction coefficients and the mechanical advantage of the mechanism. Consequently, the rated values of the mechanical advantage (clamping force) may change significantly depending on the vibratory environment, thus reducing consistency and reliability of these important mechanisms.

The friction coefficient in the contact areas can be reduced and its consistency can be enhanced by using rolling bodies (balls, rollers, etc.) between the contact surfaces of the constituting mechanical members. However, such designs require even better materials and heat treatment, higher accuracies, and are more bulky and more expensive. better materials and heat treatment, higher accuracies, and are more bulky and more expensive.

SUMMARY OF THE INVENTION

The present invention addresses the inadequacies of the prior art by providing a wedge mechanism having mechanical advantage close to the same for an ideal wedge mechanism without friction.

The present invention further improves on the prior art by providing a wedge mechanism which has high mechanical advantage while not requiring lubrication.

The present invention further improves the prior art by providing a wedge mechanism which is constructed as a solid-state mechanical device insensitive to external shocks, vibrations, and requires only a minimal maintenance.

The present invention improves and simplifies the devices employing wedge mechanisms by making the wedge mechanism largely insensitive to contamination by environmental contaminants such as water and other fluids, dirt, abrasive particles, etc.

The present invention further improves the devices employing wedge mechanisms by eliminating the need for making contact surfaces in wedge mechanism with high hardness and high geometrical accuracy of their contact surfaces, and by allowing use of light materials for structural parts of the wedge mechanisms.

BRIEF DESCRIPTION OF THE DRAWINGS

The present invention can be best understood with reference to the following detailed description and drawings, in which.

DETAILED DESCRIPTION OF THE PREFERRED EMBODIMENTS

Figure 1:
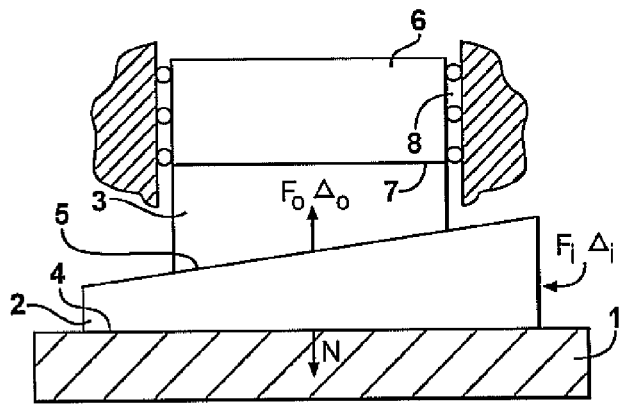
FIG. 1 is a sketch of a basic conventional (prior art) force and motion transforming wedge mechanism.
Figure 2:
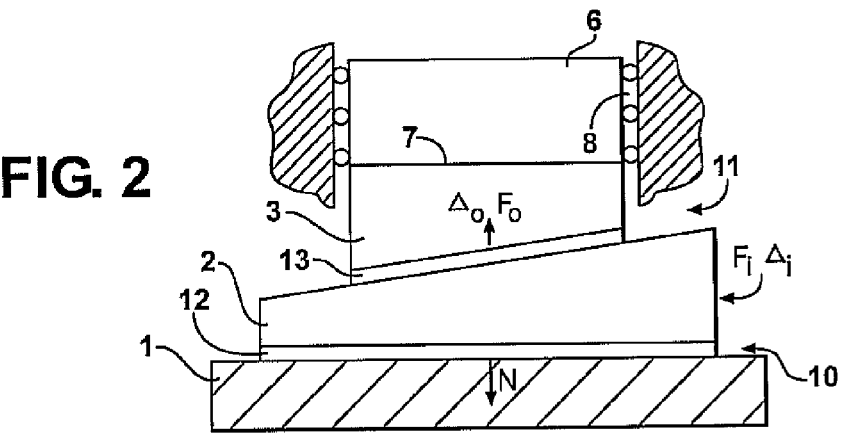
FIG. 2 is a sketch of a basic force and motion transforming wedge mechanism according to the present invention wherein the contact surfaces between the constitutive members are flat, and both contacts are realized through elastomeric layers (shims).

Referring to FIG. 2, the shown wedge mechanism comprises the same basic mechanical members as the prior art wedge mechanism depicted in FIG. 1, namely base member 1, movable wedge member 2, and output member 3 which can be interacting via surface contact 7 with work organ 6 and whose motion can be constrained by guideways 8. The wedge mechanism in FIG. 2 differs from the prior art wedge mechanism in FIG. 1 by designs of a first surface contact area 10 between base member 1 and the wedge member 2, which is movable along an axis in the direction of an applied force $F_i$ to vary the separation between the surface contact area 10 and of a second surface contact area 11 disposed between movable wedge member 2 and output member 3. The wedge member 2 has a third contact surface 15 opposed to and conforming with the first contact surface 10, and a fourth contact surface 16 opposed to and conforming with the second contact surface 11. The motion of the output member 3 along the axis in the direction of the applied input force $F_i$ produces a motion of the wedge member along the axis of the output force $F_o$, which is substantially perpendicular to the direction of motion of the wedge member. Instead of lubricant filling the surface contact areas in the design in FIG. 1, the conforming surfaces of the above respective mechanical members are separated by thin uniform thickness shims (layers) 12 and 13 made of an elastomeric (rubber-like) material.

Figure 3:
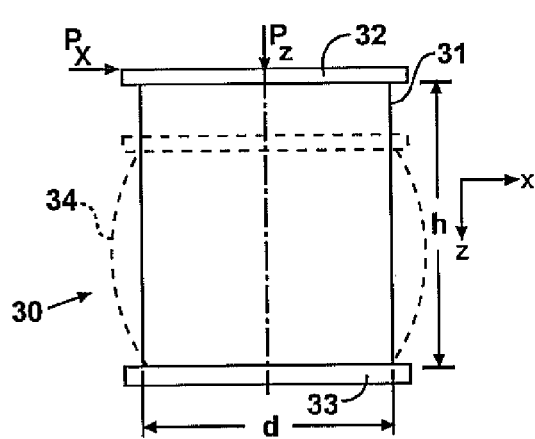
FIG. 3 illustrates the deformation pattern of a rubber cylinder in axial compression.
Figure 4:
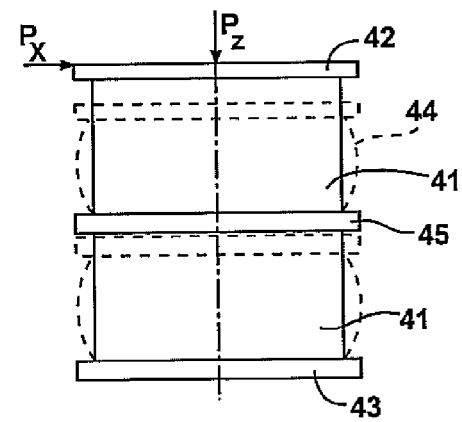
FIG. 4 illustrates the deformation pattern in compression of the rubber cylinder of FIG. 3 divided in the middle.

Since the elastomeric materials have their Poisson's ratios $\mu$ very close to 0.5, usually in the range of $\mu$=0.49-0.499, they can be considered as volumetric-incompressible materials. Thus, compression of an elastomeric specimen involves only redistribution of the specimen's volume (e.g., by bulging at the non-loaded surfaces). FIG. 3 shows a cylindrical specimen 30 comprising rubber cylinder 31 bonded to upper 32 and lower 33 covers, and subjected to axial compression force $P_z$; height h—diameter d ratio of this rubber cylinder is h/d=~1.13. Since the volume does not change, compression deformation is accompanied by bulging of rubber on the free (not loaded by forces) surfaces, thus creating convex bulges 34. The deformed conditions of the specimens in FIGS. 3 and 4 are shown by broken lines. Effective compression modulus E of the specimen having hardness H30 (soft rubber) is $$E \approx 3G(1+S^2), \quad (5)$$

e.g., see *E. I. Rivin, Stiffness and Damping in Mechanical Design, Marcel Dekker, Inc.*, 1999. Here G is the shear modulus (not dependent on the specimen geometry), and S is the "shape factor" equal to ratio between the surface area $A_l$ of the loaded surface ($A_l=\pi d^2/4$ for the FIG. 3 cylindrical specimen) to the surface area of the free-to-bulge area $A_f$ ($A_f=\pi dh$ for the FIG. 3 cylindrical specimen). Thus, for the specimen in FIG. 3

$$S=A_l/A_f=(\pi d^2/4)/(\pi dh)=d/4h \approx 0.22, E \approx 3.15G. \quad (6)$$

If an intermediate rigid plate 45 is bonded at the mid-height of the specimen in FIG. 3, as shown in FIG. 4, thus resulting in two identical shorter cylinders 41 bonded to upper 42, lower 43 and intermediate 45 plates, respectively (h'=h/2), the bulging is constrained to smaller bulges 44, thus obviously increasing the compression stiffness. This statement can be quantified by computing the shape factor and the effective compression modulus for the specimen in FIG. 4 as $$S'=A_l/A'_f=(\pi d^2/4)/[\pi d(h/2)]=d/2h \approx 0.44, E \approx 3.6G. \quad (7)$$

Thus, the compression stiffness of the specimen has increased by ~15% by dividing its height. This process of "division" can be continued thus resulting in a progressive increase of compression stiffness. With eight intermediate plates (resulting in height of each layer h"=h/9 and d/h"=~10), E=~22G, or compression stiffness becoming many times greater than the shear stiffness. The shear deformation (and stiffness) of the specimen, related to the shear force $P_x$, is not associated the volume change and does not change after the specimen is divided. While FIGS. 3 and 4 depict a cylindrical specimen, the same effects can be observed in specimens of other shapes, e.g. in a parallelepiped [width w, length l, height t, $A_l$=wl, $A_f$=2wt+2lt, and S=wl/(2wt+2lt)]. For w>10t, l>10t, E>22G. If the specimen does not have a rectangular cross section, width w and length l represent dimensions of the smallest rectangle surrounding the actual cross section, thus representing the outline dimensions of the cross section.

The increasing compression stiffness with reduction of thickness of elastomeric specimens and increase in shape factor S are accompanied with increasing tolerance for the compression forces. It is shown in *E. I. Rivin, "Properties and Prospective Applications of Ultra Thin Layered Rubber-Metal Laminates for Limited Travel Bearings," Tribology International*, 1983, Vol.16, No. 1, pp.17-25, that thin rubber layers (thickness in the order of ~1 mm) bonded to rigid (e.g., metal) surfaces can endure specific compressive forces up to 250 MPa (~37,000 psi) while maintaining low shear stiffness. It was recently demonstrated that even higher compression forces can be allowed for properly designed bonded thin elastomeric layers.

These unique characteristics of thin elastomeric layers are utilized in the design shown in FIG. 2 wherein elastomeric shims 12 and 13 comprising thin elastomeric layers are inserted into contact area 10 between base member 1 and movable wedge 2 and into contact area 11 between movable wedge member 2 and output member 3, respectively. These elastomeric shims can be bonded to the appropriate contact surfaces, glued, held by friction or by other known means. Application of input force $F_i$ to movable wedge member 2 causes shear deformations in thin elastomeric layers 12 and 13 and a corresponding displacement $\Delta_i$ of member 2. This displacement also results in generation of output force $F_o$ applied to output member 3 and reaction force N applied to base member 1. Although these forces can be much larger than $F_i$, they induce only minimal compression deformations of layers 12 and 13 if w, l>~10t, and geometry of the mechanism does not change noticeably.

In some cases, the condition w, l>~10t can be too stringent and lower aspect ratios can be beneficially used.

Since it is desirable for better functioning of the wedge mechanism in FIG. 2 to have as low shear stiffness as possible, and since the allowable compression loads on thin elastomeric layers (up to and exceeding 250 MPa) are very high, elastomeric layers 12 and/or 13 in FIG. 2 may be designed with surface areas less than the total surface contact area between members 1 and 2, 2 and 3, respectively. The preferred, but not the only, way to achieve such area reduction is by using two or more elastomeric shims satisfying the above stated aspect ratio condition to be inserted into the surface contact areas between the interacting members 1 and 2, 2 and 3 in FIG. 2. The total surface area of these shim segments may be much less than the total contact surface area between the respective members.

It is shown in above quoted paper by Rivin that increase of the compression force applied to thin elastomeric layers does not lead to increasing resistance to the shear deformation.

Figure 5:
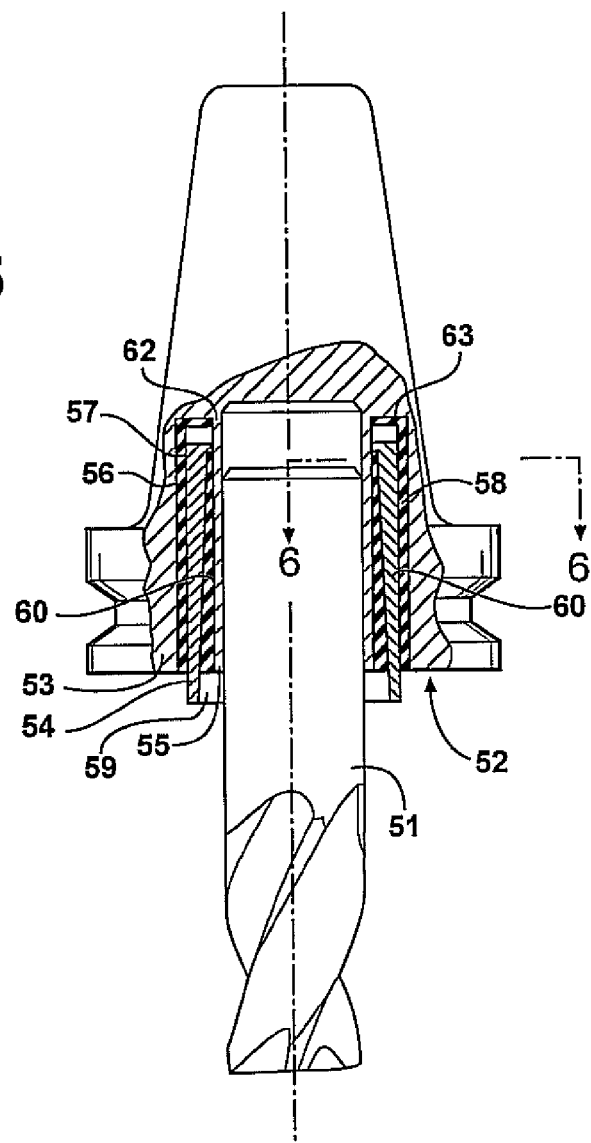
FIG. 5 is a cross section of another embodiment of the present invention wherein the contact surfaces between the constitutive members are curvilinear and both contacts are realized through elastomeric layers.
Figure 7:
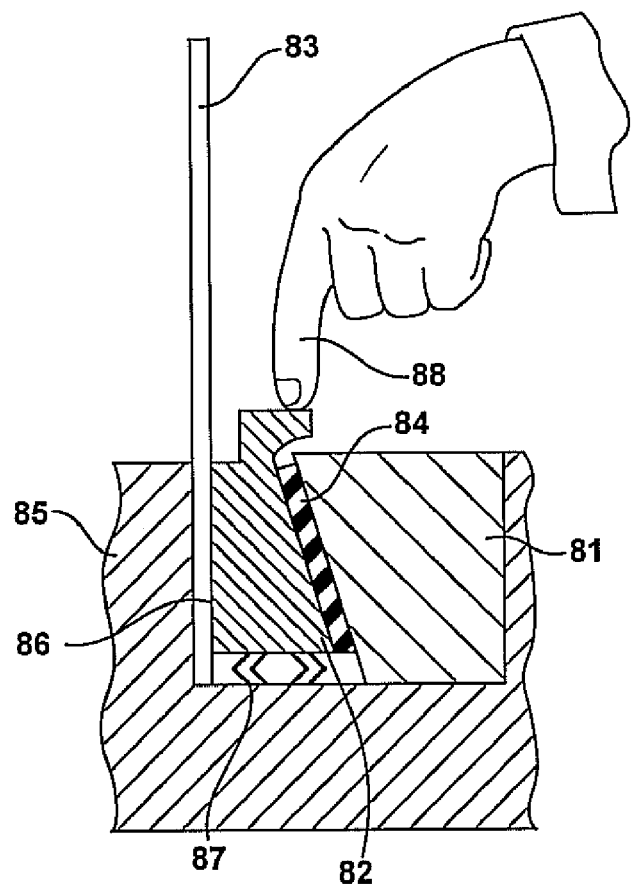
FIG. 7 illustrates yet another embodiment of the wedge mechanism according to the present invention wherein the contact surfaces between the constitutive mechanical members are flat but only one contact is realized through elastomeric shim.
Figure 8:
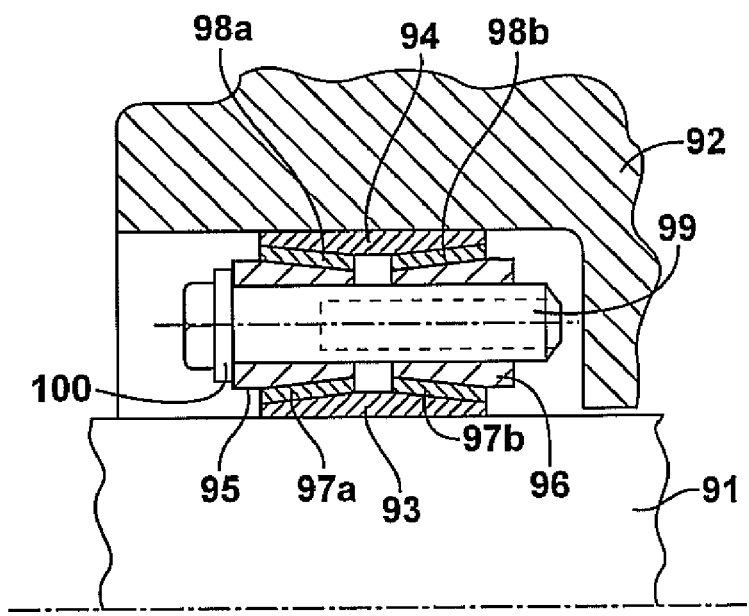
FIG. 8 illustrates yet another embodiment of the wedge mechanism according to the present invention wherein one contact area between the constitutive mechanical members is shaped as a helical thread.

Since wedge mechanisms like ones shown in FIGS. 1, 2, as well as described below in reference to FIGS. 5, 7, 8 are usually working in the range of very small displacements of movable wedge member 2 in FIGS. 1, 2 or its equivalents in FIGS. 5, 7, 8, and shear resistance of rubber layers for small deformations is very low, the wedge mechanism in FIG. 2 can be considered as a mechanism with reduced friction and zero static friction. This statement was confirmed by comparative testing of wedge mechanisms of FIG. 1 and FIG. 2 designs which demonstrated ~35% increase in mechanical advantage for mechanism per FIG. 2 having same geometry as mechanism in FIG. 1.

It is apparent that mechanism in FIG. 2 is not sensitive to contamination of the contact surfaces, and its performance is not influenced by external vibrations and shocks.

The wedge mechanism in FIG. 2 is a basic embodiment per the present invention. The embodiments illustrated below as depicted in FIGS. 5, 7, 8 illustrate some important design modifications possible within the confines of the present invention.

FIG. 5 depicts a clamping device for rotating tools (collet chuck) utilizing a modification of wedge mechanism per the present invention. Tool 51 (end mill is shown) has to be clamped in toolholder 52 while assuring precise concentricity (coaxiality) between the tool and the toolholder. The clamping wedge mechanism comprises base member 53 which is a segment of toolholder 52, movable wedge 54 and output member 55 contacting work organ (rotating tool) 51. Contact surfaces between members 53 and 54 are conforming cylindrical surfaces 56 and 57, respectively, separated by elastomeric shim 58. Contact surfaces between members 54 and 55 are conforming conical surfaces 59, 60, respectively, separated by elastomeric shim 61. Although output member 55 is physically connected to toolholder/base member 52/53 in area 62 in order to insure high concentricity, output member 55 can be considered as a free moving component of the wedge mechanism since the performance displacement of the output member in this mechanism is its small radial deformation not noticeably affected by connection 62. The external surface of output member 55 in its area 62 can be made cylindrical in order to provide guidance for and concentricity with movable wedge member 54.

Figure 6:
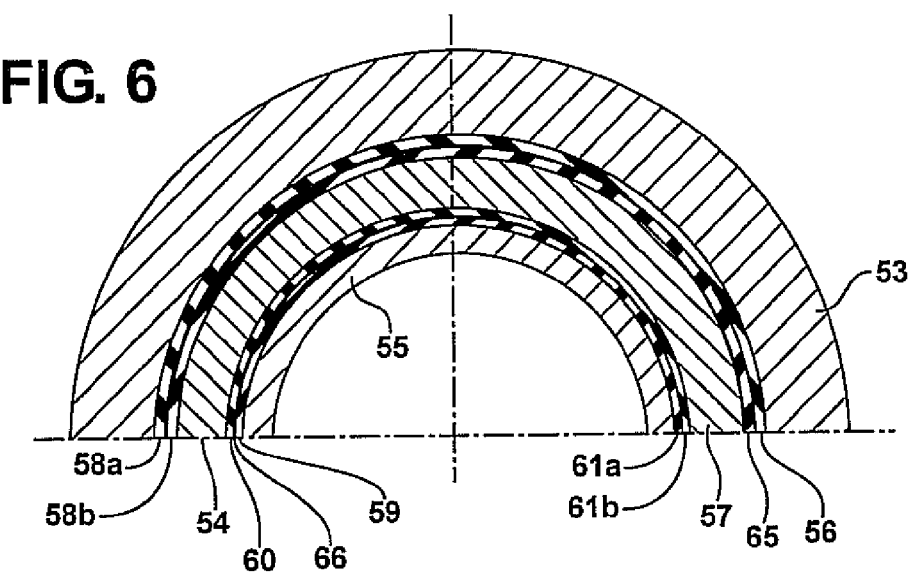
FIG. 6 shows partial cross section of the 6-6 view in FIG. 5.

While elastomeric shims 58 and 61 are shown as integral in FIG. 5 because of the relatively small scale of the drawing, their actual design is shown in the enlarged partial cross section 6-6 in FIG. 6. It can be seen in FIG. 6 that each shim 58 and 61 are comprised from two thin elastomeric layers 58a and 58b and 61a and 61b, respectively, bonded to thin intermediate rigid (e.g., metal) layer 65, 66, respectively, thus increasing shape factors of the shims. Such construction allows enhancing of compression (normal to contact surfaces 56, 57 and 59, 60, respectively) stiffness of the respective shims 58 and 61, which is important for performance of the clamped tool, while maintaining low shear stiffness, which is important for operation of the clamping wedge mechanism.

The high clamping force necessary for the required performance of the collet chuck in FIG. 5 is maintained by spring 63 (Belleville spring is shown), while release of the chuck is effected by axial displacement of movable wedge member 54 against spring 63. The force exerted by spring 63 onto movable wedge member 54 is amplified by the wedge mechanism (using conical surfaces of movable wedge 54 and output member 55 interacting via elastomeric shim 61 instead of flat wedge surfaces in FIG. 2) and applies uniformly distributed radial compression force on sleeve-shaped output member 55 causing its radial shrinkage and clamping action on tool 51. While solid sleeves 54, 55 are shown in FIGS. 5 and 6, axially slotted sleeves (one or both) can be used, as is the case in standard collet chucks.

FIG. 7 shows another embodiment of the present invention as incorporated into clamping device for a flat object (e.g., saw blade for a hand-held reciprocating saw). In FIG. 7, saw blade 83 plays the role of the output member directly, by contacting along contact surface 86 with movable wedge member 82 which, in its turn, has contact via elastomeric shim 84 with base member 81. The clamping device is assembled inside housing 85. Use of the elastomeric shim only in one surface contact area allows to establish better directional stability for saw blade 83. While using the elastomeric shim only on one contact surface of movable wedge member 82 increases motion resistance as compared with the mechanism in FIG. 2 due to presence of sliding friction between contact surfaces 86, the friction influence is reduced and the mechanical advantage is increased in comparison with conventional clamps in which all contacts in the wedge clamping mechanism are frictional contacts.

The clamping device is "normally locked" by spring 87 and can be manually (e.g., by finger 88) released by pushing movable wedge 82 against spring 87.

FIG. 8 illustrates yet another embodiment of the wedge mechanism per the present invention. In FIG. 8, a device for coaxial connection between shaft 91 and external component 92, such as a pulley or a gear, is shown. The device comprises thin internal ring 93 with double-tapered outside surface, which initially is snugly but without interference fit on shaft 91; external ring 94 with double-tapered internal surface, which is snugly but without interference fit into coaxial cavity in external component 92; two clamping rings 95 and 96 having oppositely tapered surfaces on the internal and on the external surfaces; actuating bolts 99 connecting clamping rings 95 and 96 and uniformly distributed around their circumference. External tapered surfaces of clamping rings 95 and 96 have identical taper angles with internal tapered surfaces of ring 94, thus their tapered surfaces conform with each other; internal tapered surfaces of clamping rings 95 and 96 have identical taper angles with external tapered surfaces of ring 93, thus their tapered surfaces conform with each other. Elastomeric shims 97*a*, 97*b* separate external tapered surfaces of ring 93 and internal tapered surfaces of clamping rings 95 and 96; elastomeric shims 98*a*, 98*b* separate internal tapered surfaces of ring 94 and external tapered surfaces of clamping rings 95 and 96.

This device constitutes a balanced (double-acting) modification of the wedge mechanism per the present invention. Clamping rings 95 and 96 represent movable wedge members; internal 93 and external 94 rings represent output members in the wedge mechanism; bolts 99 serve both as base members (contacting movable wedge member 95 via washer 100 and movable wedge member 96 along the threaded surface) and as actuators.

Tightening bolts 99 causes displacements (mutual approach and movement along the bolt) of two movable wedge members/clamping rings 95 and 96, and these displacements initiate wedge actions in surface contacts between tapered surfaces of rings 95, 96 and 93, and between tapered surfaces of rings 95, 96 and 94. These wedge actions are causing uniform expansion of external ring 94 and uniform contaraction of internal ring 93, thus commencing interference fits between ring 93 and shaft 91 and between ring 94 and pulley 92. These interference fits create gripping action with the respective connected components, and torque can be transmitted from 91 to 92 via these gripping contacts and via circumferential shear deformation of elastomeric shims 97 and 98.

It is readily apparent that the components of the wedge mechanism disclosed herein may take a variety of configurations. Thus, the embodiments and exemplifications shown and described herein are meant for illustrative purposes only and are not intended to limit the scope of the present invention, the true scope of which is limited solely by the claims appended thereto.

The invention claimed is:

1. A mechanical wedge mechanism comprising:
   a base member having a first contact surface;
   an output member having a second contact surface, the output member being supported with its second contact surface opposing the first contact surface of the base member, for motion along an axis which varies the separation between the first and second contact surfaces;
   a wedge member disposed between the first and second contact surfaces, having third and fourth non-parallel contact surfaces, the third contact surface of the wedge member being opposed to and conforming with the first contact surface of the base member and the fourth contact surface of the wedge member being opposed to and conforming with the second contact surface of the output member;
   the wedge member being supported for movement along an axis substantially perpendicular to the axis of movement of the output member;
   a thin constant thickness shim comprising at least one full layer of elastomeric material disposed between and contacting at least one contact surface of the wedge member and either the first contact surface of the base member or the second contact surface of the removable wedge member so that the relative motion between these contact surfaces is accommodated by internal shear said elastomeric layer; and
   said thin elastomeric layer having a length l in a dimension parallel to the motion of the wedge, a width w in a dimension normal to the motion of the wedge, and a thickness t in a third dimension, such that a ratio of l/t and a ratio of w/t are both greater than approximately 10.

2. The mechanical wedge mechanism of claim 1 wherein at least one of said shims comprises at least two thin elastomeric layers bonded to opposite sides of an intermediate rigid layer, said thin elastomeric layers satisfying the conditions that the ratio of l/t is greater than approximately 10 and the ratio of w/t is greater than approximately 10.

3. The mechanical wedge mechanism of claim 1 wherein at least one of said shims comprises at least two segments whose combined surface area is smaller than the total contact area separated by said shim.

4. The mechanical wedge mechanism of claim 1 wherein said first and second non-parallel contact surfaces are shaped as coaxial cylindrical or conical surfaces.

* * * * *